(12) United States Patent
Bhatt et al.

(10) Patent No.: US 6,799,184 B2
(45) Date of Patent: Sep. 28, 2004

(54) RELATIONAL DATABASE SYSTEM PROVIDING XML QUERY SUPPORT

(75) Inventors: Vadiraja Bhatt, Alameda, CA (US); Srikanth Sampath, Danville, CA (US); Anupam Singh, Alameda, CA (US); Raghavan T. Eachampadi, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 445 days.

(21) Appl. No.: 10/066,134

(22) Filed: Jan. 30, 2002

(65) Prior Publication Data
US 2003/0101169 A1 May 29, 2003

Related U.S. Application Data
(60) Provisional application No. 60/300,573, filed on Jun. 21, 2001.

(51) Int. Cl.[7] .............................................. G06F 17/30
(52) U.S. Cl. .......................................... 707/102; 707/3
(58) Field of Search ............................. 707/3, 102, 10, 707/1, 104.1; 705/14

(56) References Cited

U.S. PATENT DOCUMENTS

| | | | |
|---|---|---|---|
| 6,356,906 B1 | 3/2002 | Lippert et al. ................ 707/10 |
| 6,397,219 B2 | 5/2002 | Mills ........................... 707/10 |
| 6,418,448 B1 * | 7/2002 | Sarkar ....................... 707/104.1 |
| 6,466,940 B1 | 10/2002 | Mills .......................... 707/102 |
| 6,480,860 B1 | 11/2002 | Monday ....................... 707/102 |
| 6,510,434 B1 | 1/2003 | Anderson et al. ........... 707/100 |
| 6,549,922 B1 | 4/2003 | Srivastava et al. .......... 707/205 |
| 6,587,855 B1 | 7/2003 | Ellmann et al. .............. 707/10 |
| 6,604,100 B1 | 8/2003 | Fernandez et al. ............ 707/3 |
| 6,622,144 B1 | 9/2003 | Rush .......................... 707/101 |
| 6,631,379 B2 | 10/2003 | Cox ........................... 707/100 |
| 6,631,519 B1 | 10/2003 | Nicholson et al. .......... 717/169 |
| 6,635,089 B1 | 10/2003 | Burkett et al. .............. 715/513 |
| 6,636,845 B2 | 10/2003 | Chau et al. ................... 707/1 |
| 6,643,633 B2 | 11/2003 | Chau et al. ................... 707/1 |
| 6,658,429 B2 * | 12/2003 | Dorsett, Jr. .................. 707/1 |
| 2002/0029166 A1 * | 3/2002 | Jacobs et al. ................ 705/14 |
| 2002/0169777 A1 * | 11/2002 | Balajel et al. ............... 707/10 |
| 2003/0212667 A1 * | 11/2003 | Andersch et al. ............. 707/3 |

* cited by examiner

Primary Examiner—Diane D. Mizrahi
(74) Attorney, Agent, or Firm—G. Mack Riddle; John A. Smart

(57) ABSTRACT

A system providing methods enabling data in Extensible Markup Language ("XML") format to be extracted, transformed and stored in a database, file system or main memory is described. The extraction and transformation process is generalized and can be used on various types of XML data, enabling XML data to be stored and queried using standard database query methodologies. The system includes parse-time functionality to transform XML documents into a structure having an interface that enables efficient access to the underlying data. The system also includes query execution-time functionality providing greater efficiency by bringing only the relevant portions of transformed XML data into memory in response to a query. The system parses and translates queries into a structure that can be executed without the need to write custom application-specific navigation code to search XML data. The system also enables original XML documents (or portions thereof) to be recomposed when required.

73 Claims, 11 Drawing Sheets

STRUCTURE OF
OID OFFSET TABLE

RELATIONAL DATABASE SYSTEM PROVIDING XML QUERY SUPPORT

RELATED APPLICATIONS

The present application is related to and claims the benefit of priority of the following commonly-owned provisional application(s): application serial No. 60/300,573, filed Jun. 21, 2001, entitled "Relational Database System Providing XML Query Support", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

COMPUTER PROGRAM LISTING APPENDIX

A Computer Program Listing Appendix, containing fourteen (14) total files on compact disc, is included with this application.

BACKGROUND OF THE INVENTION

1. Field of the Invention

The present invention relates generally to information processing environments and, more particularly, to a database system providing methods that handle, manage, and store information in Extensible Markup Language (XML) format and that support queries of XML documents and data.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of a database management system is known in the art. See e.g., Date, C., "An Introduction to Database Systems, Volume I and II," Addison Wesley, 1990, the disclosure of which is hereby incorporated by reference.

DBMS systems have long since moved from a centralized mainframe environment to a de-centralized or distributed environment. One or more PC "client" systems, for instance, may be connected via a network to one or more server-based database systems. Commercial examples of these "client/server" systems include Powersoft® clients connected to one or more Sybase® Adaptive Server® database servers. Both Powersoft® and Sybase® Adaptive Server® (formerly Sybase® SQL Server®) are available from Sybase, Inc. of Emeryville, Calif.

In recent years, this distributed environment has shifted from a standard two-tier client/server environment to a three-tier client/server architecture. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the "database server." Three-tier database systems are well documented in the patent and trade literature, see e.g., commonly-owned U.S. Pat. No. 6,266,666, entitled "Component transaction server for developing and deploying transaction-intensive business applications," the disclosure of which is hereby incorporated by reference.

More recently, the first tier (or client) for many three-tier systems is accessing the second-tier application server through the Internet, typically using a Web browser, such as Netscape Navigator or Microsoft Internet Explorer. Increasingly, applications running on these systems provide for business-to-business or business-to-consumer interaction via the Internet between the organization hosting the application and its business partners and customers. Many organizations receive and transmit information to business partners and customers through the Internet.

A considerable portion of the information received or exchanged is in Extensible Markup Language or "XML" format. XML is a pared-down version of SGML, designed especially for Web documents, which allows designers to create their own customized tags, enabling the definition, transmission, validation, and interpretation of data between applications and between organizations. For further description of XML, see e.g., "Extensible Markup Language (XML) 1.0," (2nd Edition, Oct. 6, 2000) a recommended specification from the W3C, the disclosure of which is hereby incorporated by reference. A copy of this specification is currently available on the Internet at http://www.w3.org/TR/2000/REC-xml-20001006. Many organizations utilize XML to exchange data with other remote users over the Internet.

As an increasing amount of information is in XML format, users want to be able to search this XML information in an efficient manner. However, this XML data is not in a format that can be easily stored and searched in current database systems. Most XML data is sent and stored in plain text format. This data is not formatted in tables and rows like information stored in a relational DBMS. To search this semi-structured data, users typically utilize keyword searches similar to those utilized by many current Internet search engines. These keyword searches are resource-intensive and are not as efficient as relational DBMS searches of structured data. For example, a user may perform a keyword search for "Harrison Ford." This keyword search would not only return information regarding the actor with this name, but would also typically return information on Ford automobiles or dealerships owned by Harrison.

Given the increasing use of XML in recent years, many organizations now have considerable quantities of data in XML format, including Web documents, newspaper articles, product catalogs, purchase orders, invoices, and product plans. To extract and store this XML data, developers currently utilize Document Object Model ("DOM") processors. DOM itself represents a specification of how objects in HTML and XML documents (text, images, headers, links, and the like) are represented. These DOM processors are very application-specific as developers typically write specific drivers for specific applications and types of data. For example, one particular processor may deal primarily with large static documents and catalogs, while another processor may handle smaller and more dynamic data such as orders, invoices, messages, and other types of data.

Documents and catalogs can be quite large and contain a lot of information, but are generally static. Searching large catalogs using these existing DOM processors is inefficient, as it requires reparsing the document and searching by text keyword. Both of these processes are very resource-intensive. Orders, invoices, and messages are usually smaller, but more frequent in number and more dynamic. In the case of these types of data, there is a need to be able to efficiently locate the appropriate item from a large group of similar items. For example, a user may wish to find invoices sent to a particular customer without having to search through all of the invoices in the system.

Another category of semi-structured information currently handled by these DOM processors is "transitional RDBMS data." Transitional RDBMS data is information that may be stored by an organization in a relational DBMS, but that is exchanged with another company (or another group within the same company) in XML format. For example, Company A sends certain information from its product database to Company B in XML format. Existing systems provide no effective mechanisms for Company B to store this XML data in Company B's relational DBMS or to search this information in the same fashion as other data in Company B's relational DBMS.

Organizations with data in XML format also typically have other enterprise data stored in a structured format in a relational DBMS. Another current problem is that the many existing relational DBMS applications used by these organizations cannot easily access both structured data stored in these databases as well as XML and other unstructured or semi-structured data. In addition, current systems do not enable searches of XML data using established Structure Query Language (SQL) queries and search methodologies.

As yet another problem, current DOM processing systems are also cumbersome to maintain. With these existing DOM processors, new code typically must be written for every new addition to the XML definition. There is currently no flexible, repeatable solution for efficiently extracting, storing, and searching XML data. As a result, the advantages of XML have yet to be realized in the enterprise.

What is needed is an improved database system with built-in support for performing several key tasks in handling and managing XML content. Such a system should be able to decompose and extract data in XML format, and do so in a manner that permits full utilization of such data within a business' enterprise software systems. For example, with a purchase order, a user should have access to a database system that is able to separate and process product information, customer information (such as the customer name and shipment address) and pricing. The solution should enable users to search this transformed XML data using well-known database search tools and methodologies, rather than requiring the use of less efficient keyword searches. Additionally, the solution should also enable users to recompose the XML data in order to recreate the original document, message or object and its context. The present invention fulfills these and other needs.

GLOSSARY

The following definitions are offered for purposes of illustration, not limitation, in order to assist with understanding the discussion that follows.

DOM: DOM is short for Document Object Model, the specification for how objects in a Web page (text, images, headers, links, etc.) are represented. The Document Object Model defines what attributes are associated with each object, and how the objects and attributes can be manipulated. Dynamic HTML (DHTML) relies on the DOM to dynamically change the appearance of Web pages after they have been downloaded to a user's browser. For further information on DOM, see e.g., "Document Object Model (DOM) Level 3 Core Specification, Version 1.0," World Wide Web Consortium Working Draft (Sep. 13, 2001), the disclosure of which is hereby incorporated by reference. A copy of this draft specification is currently available from the World Wide Web Consortium (W3C) via the Internet at http://www.w3.org/DOM.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML documents is available in the technical and trade literature, see e.g., Duncan, R. "Power Programming: An HTML Primer," PC Magazine, Jun. 13, 1995, the disclosure of which is hereby incorporated by reference.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the W3C, and is currently available via the Internet at http://www.w3.org/Protocols/. Additional description of HTTP is available in the technical and trade literature, see e.g., Stallings, W. "The Backbone of the Web," BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Virtual Machines (JVMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference.

Meta data: Meta data is data about data. Meta data describes how a particular set of data was collected, and how the data is formatted. Meta data may also describe when data was collected and by whom it was collected. Meta data is very useful for understanding information stored in data warehouses.

SGML: SGML stands for Standard Generalized Markup Language, a system for organizing and tagging elements of a document. SGML was developed and standardized by the International Organization for Standardization (ISO), see e.g., International Organization for Standardization, ISO 8879: "Information processing—Text and office systems—Standard Generalized Markup Language (SGML)," ([Geneva]: ISO, 1986), the disclosure of which is hereby incorporated by reference. SGML itself does not specify any particular formatting; rather, it specifies the rules for tagging elements. These tags can then be interpreted to format elements in different ways. For an introduction to SGML, see e.g., "A Gentle Introduction to SGML," 1995, chapter 2 of "Guidelines for Electronic Text Encoding and Interchange (TEI)" produced by the Text Encoding Initiative, the disclosure of which is hereby incorporated by reference. A copy of "A Gentle Introduction to SMGL" is currently available via the Internet at http://www.uic.edu/orgs/tei/sgml/teip3sg/SG.htm.

SQL: SQL stands for Structured Query Language, which has become the standard for relational database access, see e.g., Melton, J. (ed.), "American National Standard ANSI/ISO/IEC 9075-2: 1999, Information Systems—Database Language—SQL Part2: Foundation," the disclosure of which is hereby incorporated by reference. For additional information regarding SQL in database systems, see e.g., Date, C., "An Introduction to Database Systems, Volume I and II," Addison Wesley, 1990, the disclosure of which is hereby incorporated by reference.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., RFC 793, the disclosure of which is hereby incorporated by reference. A copy of RFC 793 is currently available at http://www.ietf.org.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial," the disclosure of which is hereby incorporated by reference. A copy of RFC 1180 is currently available at ftp://ftp.isi.edu/in-notes/rfc1180.txt.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML stands for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see e.g., "Extensible Markup Language (XML) 1.0," (2nd Edition, Oct. 6, 2000) a recommended specification from the W3C, the disclosure of which is hereby incorporated by reference. A copy of this specification is currently available on the Internet at http://www.w3.org/TR/2000/REC-xml-20001006.

XQL: XQL refers to a standard XML Query Language proposed to the W3C consortium, XSL working group in 1998. For further description of the proposal, see e.g., "XML Query Language (XQL)," a W3C working draft (Jun. 7, 2001), the disclosure of which is hereby incorporated by reference. This draft specification is available from the W3C and is currently available via the Internet at http://www.w3.org/TandS/QL/QL98/pp/xql.html. Currently, XQL is the most commonly used language for querying XML documents.

SUMMARY OF THE INVENTION

The present invention provides a system including methods enabling data in Extensible Markup Language ("XML") format to be extracted, transformed, and persistently stored in a relational database. This extraction and transformation process is generalized, and can be used on various types of data from various sources. During the process of extraction and transformation of XML data, the present invention creates and uses meta data structures to enable faster access to the XML data.

The XML Query Support Engine of the present invention includes an XML Store Engine, a Path Processor and an XQL Engine. The XML Store Engine includes parse time functionality that transforms each XML document into a collection of bytes, called "SybXMLData," that can be stored in a database or file system. Furthermore, a streaming interface over this SybXMLData called "SybXMLStream," is defined to provide fast, random access to the structures within it. In this document the terms "SybXMLData" and "SybXMLStream" are used interchangeably to refer to this data and streaming interface. The SybXMLStream includes a fast access structure, which is a flexible, persistent interface that enables free movement amongst, and efficient access to the underlying XML data. The XML Store Engine also has query execution-time functionality for retrieving data in response to query plans specified by the XQL Engine. It enables greater efficiency as only the relevant portions of the underlying XML data are brought into memory in response to a query. The system also enables the original XML document (or a portion thereof) to be recomposed when required.

The Path Processor serves as an interface between the XML Store Engine and the XQL Engine. The Path Processor abstracts the interactions with the XML Store Engine to a higher level, enabling the XQL Engine (as well as other different query engines) to more easily access data from the XML Store Engine.

The XQL Engine of the present invention uses a query language known as XQL, which enables querying of XML data without the need to write custom application-specific navigation code to search different types of XML data. The XQL Engine parses and translates queries into a structure that can be executed against the XML Store Engine.

Utilizing the present invention, XML data can be stored once and queried many times. The XML Query Support Engine enables XML data to be searched using standard database query methodologies, rather than inefficient keyword text searches. The system is scalable and is also easier to maintain, as it does not need to be rewritten each time the XML definition is changed. In the currently preferred embodiment, the XML Query Support Engine is written in Java, enabling the system to be deployed on a number of different platforms. Moreover, the system provides access to data that may reside on different machines in multiple locations, as the invocation of the XML Query Support Engine is independent of document location.

DETAILED DESCRIPTION OF A PREFERRED EMBODIMENT

The following description will focus on the presently preferred embodiment of the present invention, which is implemented in a distributed computing environment (e.g., client/server deployments running under Microsoft Windows XP) with Internet connectivity. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1:
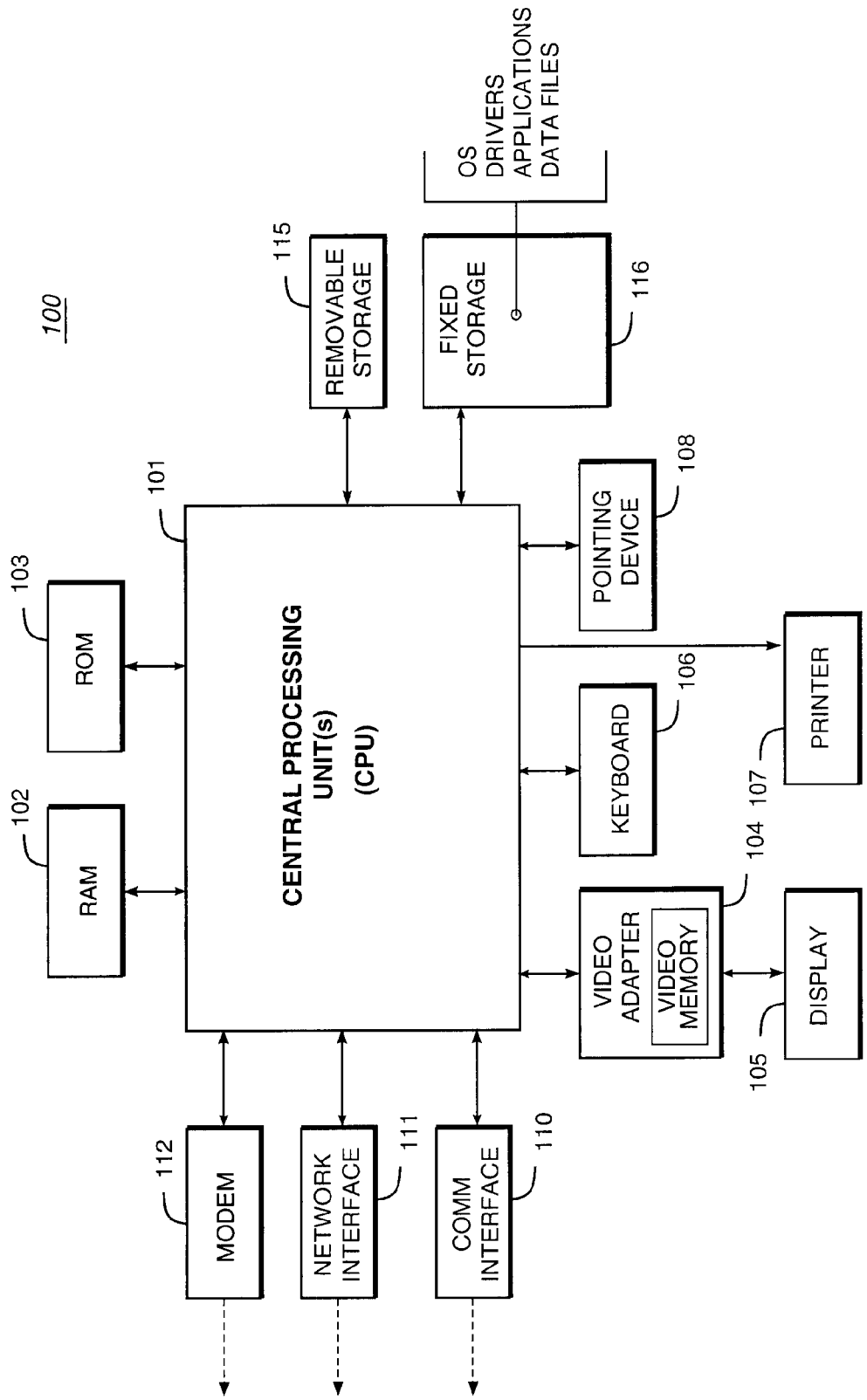
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD), or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® (printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
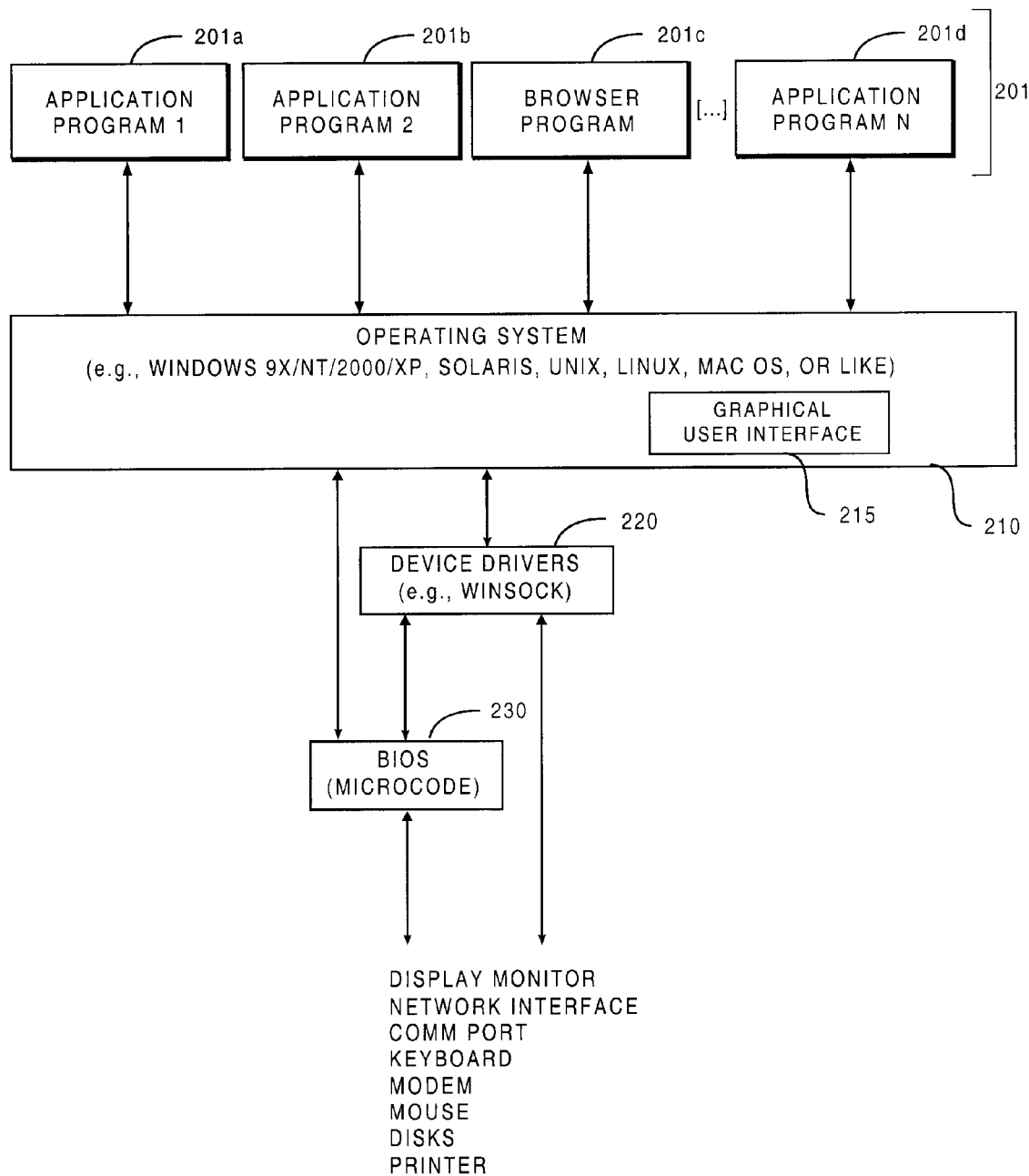
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., back-end database server, middle-tier application server, and the like) that communicates with one or more "clients" (e.g., personal computers running client-side applications). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Providing Built-in XML Support in a Database System

A. Overview

The present invention provides a database system implementing built-in methods for efficiently performing several key tasks in handling and managing XML content. The system enables XML data to be extracted, transformed, and persistently stored in a relational database, within columns of individual relational tables. This extraction and transformation process is generalized and can be used on various types of data from various sources. During the extraction and transformation process, methods of the present invention create a collection of bytes and a streaming interface, referred to herein as a "SybXMLStream" object. The transformed object that is generated may then be stored in a database or a file system. A SybXMLStream object includes a fast access structure to provide database-like access to the underlying XML data. This fast access structure is a flexible, persistent interface that enables free movement amongst, and efficient access to, the underlying XML data. The system and methodology of the present invention increase efficiency as only the relevant portions of the underlying XML data are brought into memory in response to a query. The system also enables the recomposition of the original XML document (or a portion thereof) as required.

In the currently preferred embodiment, the system uses XML Query Language or XQL, which enables querying of XML data without the need to write custom application-specific navigation code to search different types of XML data. XQL has been proposed as a standard to the World Wide Web Consortium, XSL working group. For further description of the proposal, see e.g., "XML Query Language (XQL)," a W3C working draft (Jun. 7, 2001), the disclosure of which is hereby incorporated by reference. Currently, XQL is the most commonly used language for querying XML documents. Utilizing the database system of the present invention, XML data can be transformed and stored to enable such data to be queried many times using standard database query methodologies, rather than inefficient keyword text searches.

The system is scalable and is easier to maintain, as underlying programming logic does not need to be created or rewritten each time the XML definition is changed. In the currently-preferred embodiment, the XML Query Support Engine is written in Java, enabling it to be deployed on a number of different platforms. Moreover, the system provides access to data that may reside on different machines in multiple locations. The invocation of the XML Query Support Engine is independent of the document location. The data that is searched may be located in any suitable format, such as located in a file or a database, or located via a reference (e.g., a URL).

B. Modular Description of XML Query Support Engine

Figure 3:
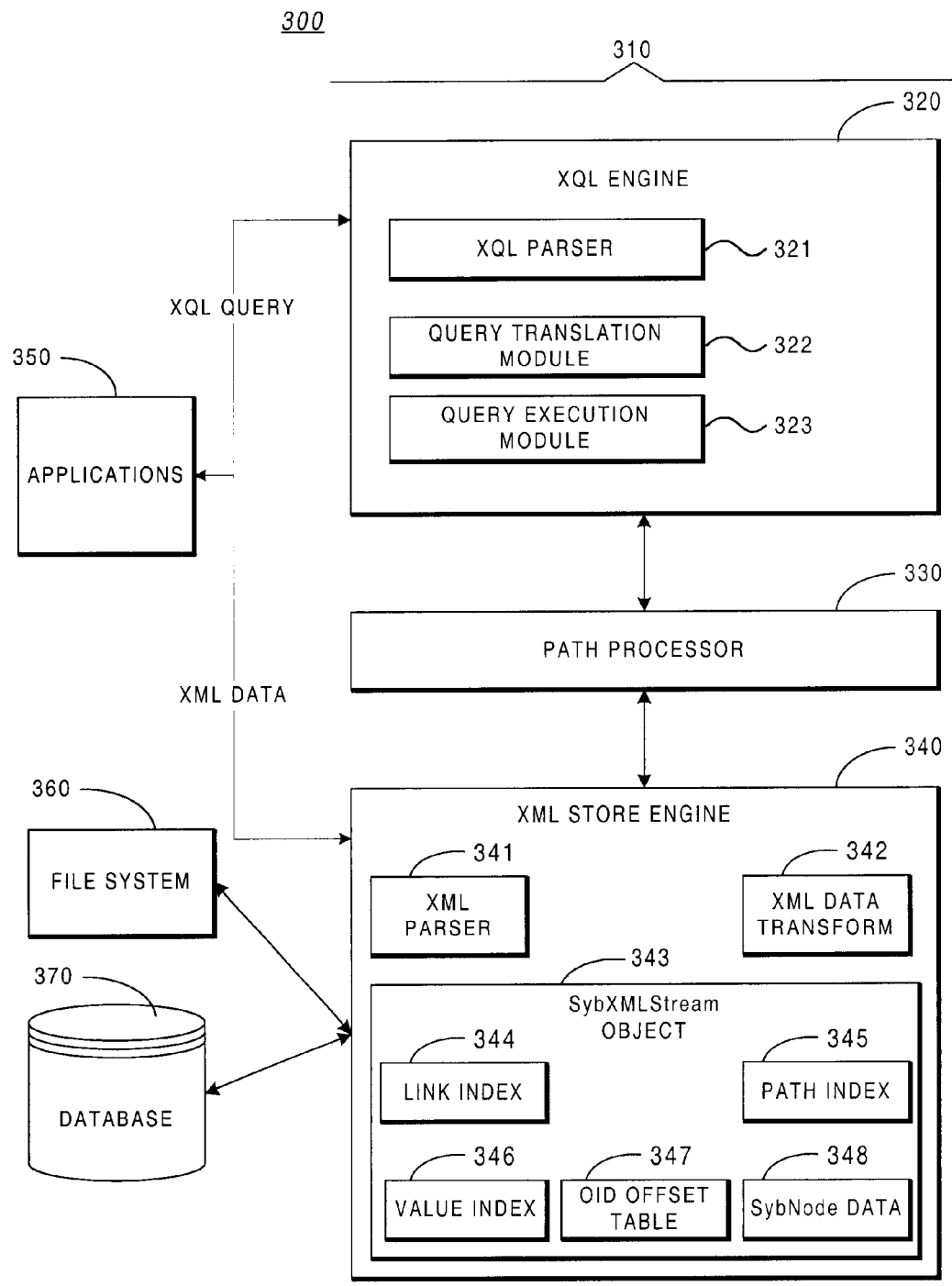
FIG. 3 is a block diagram of an environment in which the XML Query Support Engine of the present invention may be implemented.

FIG. 3 is a block diagram of an exemplary environment 300 in which an XML Query Support Engine 310 of the present invention may be embodied. As shown, XML Query Support Engine 310 includes an XQL Engine 320, a Path Processor 330, and an XML Store Engine 340. In addition to the above components of XML Store Engine 310, environment 300 also includes applications 350, a file system 360, and a database 370. The operation of each of the components of XML Query Support Engine 310 will now be described in greater detail.

The first major component of XML Query Support Engine 310 is XQL Engine 320. XQL Engine 320 includes an XQL parser 321, a query translation module 322, and a query execution module 323. As shown at FIG. 3, applications 350 may access data by executing queries against XQL Engine 320. Queries received by XQL Engine 320 are parsed by XQL parser 321, which converts the query expression into a logical tree. Query translation module 322 translates this logical tree (i.e., the parsed query) into a structure or plan that can be executed against XML Store Engine 340. Query execution module 323 handles the execution of the query plan, interfacing with Path Processor 330 to access transformed XML data in XML Store Engine 340.

Path Processor 330 serves as an interface between XQL Engine 320 and XML Store Engine 340. Path Processor 330 abstracts the interaction with XML Store Engine 340 to a higher level enabling different types of queries to more easily access data from XML Store Engine 340. In this manner, the query language does not need to include details about the access of information from XML Store Engine 340.

XML Store Engine 340 includes parse-time functionality for transforming unstructured or semi-structured data into transformed objects that can be queried using standard database search methodologies. As shown at FIG. 3, applications 350 may submit XML data to the XML Store Engine 340 for transformation and storage. XML data transformed by XML Store Engine 340 may be stored in file system 360, database 370, or in system memory in XML Store Engine 340. XML Store Engine 340 also includes query execution-time functionality for retrieving data from transformed objects in response to queries. XML Store Engine 340 includes XML parser 341 and XML data transform module 342. XML parser 341 receives a source XML document and checks to verify that the document is valid and well formed. XML data transform module 342 includes parse-time functionality that creates indices for each XML document and converts (or transforms) the XML document into a transformed object referred to as a SybXMLStream data structure or object 343 (the "SybXMLStream" is described in more detail below). XML data transform module 342 also retrieves data from a SybXMLStream object in response to query plans specified by XQL Engine 320 and creates an XML document (or document fragment) incorporating this data.

A SybXMLStream object 343 created by XML Store Engine 340 contains data from the transformed document together with auxiliary structures to aid in faster access to the data. During the transformation process, each element of an XML document is treated as a node or leaf (i.e., terminal node) and these nodes and leaves are annotated to provide faster access to data. The structure of the tree itself is derived from the structure of the source document. As shown at FIG. 3, each SybXMLStream object 343 includes a link index 344, a path index 345, a value index 346, an OID-Offset table 347, and SybNode data 348. Each of these components will now be explained in more detail. Link index 344 stores linkage information about the parent-child relationship of nodes. This linkage information enables the source document to be recomposed when required. Path index 345 stores hierarchical information about particular items of data in the order that these items occur in the source document. Value index 346 stores values for a given path in a sorted order to enable more efficient searches. OID-Offset table 347 maintains a table of object identifiers (OIDs) for each node of the transformed document, a corresponding data offset describing data for each node having data, and a link offset describing parent-children relationships of each node. SybNode 348 contains data associated with particular nodes in the document. The SybNodes are collectively referred to as SybXMLData.

C. Operations of XML Query Support Engine

Operation of the present invention is perhaps best illustrated by way of example. Consider, for example, the following sample XML data containing information about publications and authors from a bookstore catalog.

---

1. Sample XML data

Example 1 - Sample XML Data

```
<?xml version='1.0' standalone = 'no'?>
<bookstore specialty='novel'>
    <book style='autobiography'>
        <title>Seven Years in Trenton</title>
        <author>
            <first-name>Mary</first-name>
            <last-name>Bob</last-name>
            <award>Trenton Literary Review Honorable Mention</award>
        </author>
        <price>12</price>
    </book>
    <book style='textbook'>
        <title>History of Trenton</title>
        <author>
            <first-name>Joe</first-name>
            <last-name>Bob</last-name>
            <publication>
                Selected Short Stories of
                <first-name>Joe</first-name>
                <last-name>Bob</last-name>
            </publication>
        </author>
        <price>55</price>
    </book>
<magazine style='glossy' frequency='monthly'>
        <title>Tracking Trenton</title>
        <price>2.50</price>
        <subscription price='24' per='year'/>
    </magazine>
    <book style='novel' id='myfave'>
        <title>Trenton Today, Trenton Tomorrow</title>
        <author>
            <first-name>Toni</first-name>
            <last-name>Bob</last-name>
            <degree from='Trenton U'>B.A.</degree>
            <degree from='Harvard'>Ph.D.</degree>
            <award>Pulitzer</award>
            <publication>Still in Trenton</publication>
            <publication>Trenton Forever</publication>
```

-continued

1. Sample XML data

```
        </author>
        <price int1='canada' exchange='0.7'>6.50</price>
    </book>
        <book style='leather' price='29.50'
xmlns:my='http://www.placeholder-name-here.com/schema/'>
            <title>Who's Who in Trenton</title>
            author>Robert Bob</author>
        </book>
</bookstore>
```

The above XML data is semi-structured in that each of the XML data elements is tag delimited. The format of XML data is different than that of data records in a relational DBMS. For example, the records in a relational DBMS are arranged into predefined columns (attributes) of information; thus, database records appear uniform. Semi-structured XML data, on the other hand, may contain various different items of information. For example, the XML data illustrated above contains different elements for each of the publications. One author is shown as having degrees from Trenton University and Harvard, while degree information is not supplied for the other authors.

2. Annotated Sample XML Data

Figure 4A:
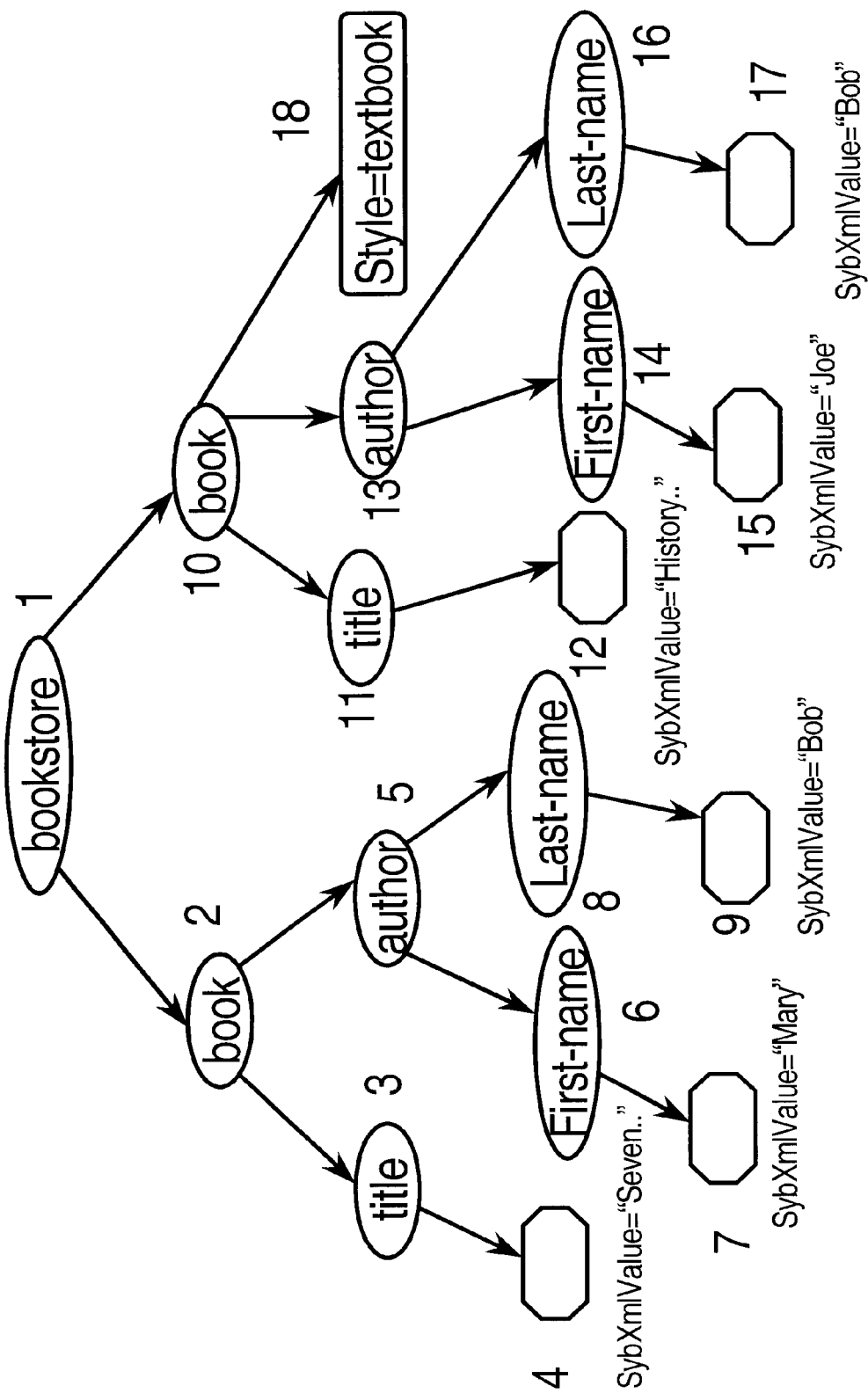
FIG. 4A is an example illustrating the creation of the structure of a SybXMLStream object by the XML Store Engine of the present invention.

An example illustrating the creation of the structure of a SybXMLStream object is illustrated at FIG. 4A. As shown in FIG. 4A, bookstore 1 is the root node of the structure. Under this bookstore node 1 are two books (book 2 and book 10) that are elements and children of parent bookstore 1. Title 3 and author 5 are elements that are children of book 2. Leaf 4 is text with the value (or SybXMLvalue) "Seven . . . ". This leaf 4 contains the title of the book in text format. First-name 6 and last-name 8 are elements and children of author 5. Leaf 7 is text with the value "Mary" indicating that the first name of the author of book 2 is Mary. Leaf 9 is text with the value "Bob" indicating that the author's last name is Bob. Book 10 has three children: title 11, author 13 and an attribute, Style 18. The value of the attribute Style is "textbook". Note that the attribute is a leaf node. Title 11 is a node with one child leaf 12. Leaf 12 is text with the value "History . . . " which is the title of book 10. Author 13 is a node with two children: First-name 14 and Last-name 16. First-name 14 and Last-name 16 are elements. Leaf 15 is text and the child of First-name 14. It has a value of "Joe" indicating that the first name of the author of book 10 is Joe. Leaf 17 is text and the child of Last-name 16. It has a value of "Bob" indicating that the last name of the author of book 10 is Bob.

During the process of transforming an XML document and generating a SybXMLStream object, each of these nodes is annotated to enable more efficient storage and retrieval of the underlying information. An example of the annotation of these nodes is illustrated on FIG. 4B, which shows the same document structure illustrated in FIG. 4A with the addition of data offsets for each of the nodes in this structure. The offsets shown at FIG. 4B are for the purposes of illustration only.

Figure 4B:
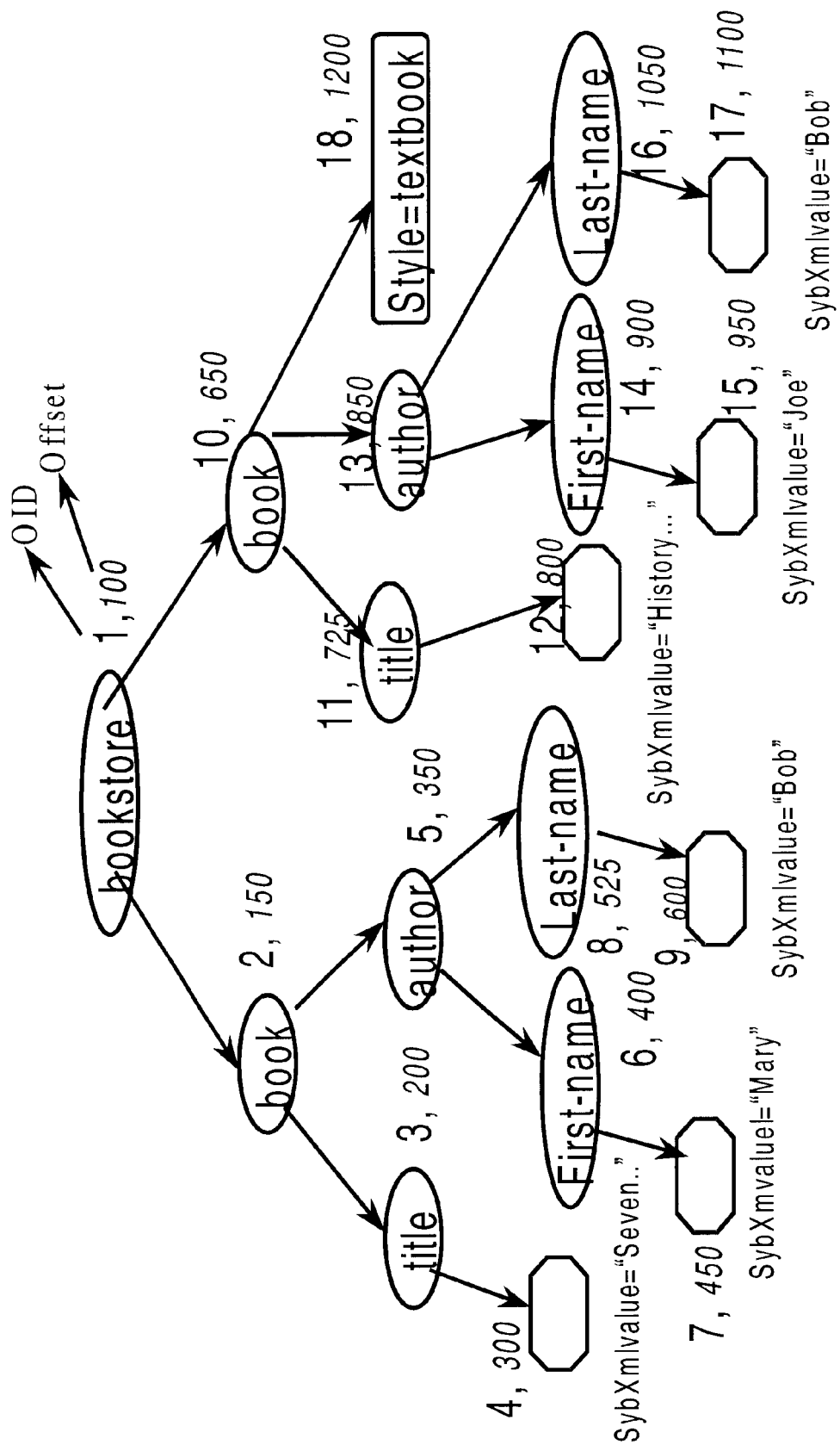
FIG. 4B is an example illustrating the annotation of the structure of a SybXMLStream object with object identifiers and offsets.

The element object ID (or OID) numbers from 1 to 18 annotated on the tree shown at FIG. 4B are assigned by the XML Store Engine. These OID numbers are assigned in the order information is presented in the original source XML document. The structure of the tree itself is derived from the structure of the underlying source XML document. During the transformation process, each element of an XML document is treated as a node or leaf (i.e., terminal node) as described above. These nodes and leaves are annotated to provide faster access to the data and to enable the original document to be recomposed when required. The offsets, numbered from 100 to 1200 as shown at FIG. 4B, indicate where the information from the source XML document is actually stored in the data portion of the SybXMLStream. For example, the bookstore is assigned object ID (OID) 1 and offset 100, as shown at FIG. 4B. The offsets and object IDs generated during the parsing and transformation process are stored as described in more detail below and are used to retrieve the underlying information when it is required.

3. Transformation of XML Data by XML Store Engine

The XML Store Engine 340 transforms an XML document by analyzing the document as a tree. As discussed above, an XML document can be viewed as a graph where:

(1) each element is a node;
(2) the text or value (e.g., the value "Mary" as the first name of an author) associated with an element is a leaf node;
(3) each attribute (e.g., Style=textbook) is a leaf node;
(4) each node is labeled uniquely; and
(5) all nodes are labeled in the order they occur in the source document.

During the transformation process, each node is labeled uniquely by assigning an integer to each node in a monotonically increasing order. This integer is referred to as object ID or OID. During this process, each element of the source document is visited in turn and each element is numbered based upon the order it occurs in the document.

The transformation process begins when an original source document (in this example, a bookstore catalog) is fed into the XML parser of the XML Store Engine. The XML parser verifies that the document is well formed and valid. An XML document is well formed when every element is the child of only one parent element. For example, each book must be associated as the child of only one particular bookstore. If this same book is also available in another bookstore, it should be listed separately as an element under that second bookstore. A single book element cannot be associated as a child of two different bookstore elements in a well-formed XML document. The document is also checked for validity to verify that the document elements conform to the document's data type definition (or DTD).

Next, the XML data transform module uses simple API for XML (referred to hereinafter as "SAX") methodology (in the form of callback routines) to create a SybXMLStream object. The SybXMLStream object contains the transformed document together with auxiliary structures to aid in faster access to the data. From the callbacks provided by the XML parser, the data transform module creates three different indices. Referring back to FIG. 3, these indices comprise: a link index 344, a path index 345, and a value index 346. Also, an OID-Offset table 347 is created along with SybNodes 348 containing data for the nodes. All these nodes are collectively referred to as SybXMLData.

The transformed SybXMLStream object includes data from the source XML document together with meta data generated during the transformation process. A SybXMLStream object includes the following components:

| Component | Description |
| --- | --- |
| Header | Header information |
| Path Index | Index for each unique path (includes Value Index) |

-continued

| Component | Description |
| --- | --- |
| Link Index | Index maintaining parent-child relationships |
| OID-Offset Table | Object ID—Offsets relationship |
| SybNode Values | Data (information) for each Node |

After the XML document is transformed, the original raw XML document is not stored with the transformed object. A SybXMLStream object includes a streaming interface over data from the transformed XML document, enabling efficient data access by providing ability to randomly seek within the stream as described below. This enables the system to bring only the relevant portion of the transformed document into memory in response to a query. For example, if a particular query is looking for books in this catalog, data retrieved is restricted to books. Other information in this catalog, such as information regarding magazines, will not be retrieved.

The link index 344 stores linkage information enabling the XML Query Engine to recompose an original source document (or portion thereof). The link index contains information about the parent-child relationship of nodes. Given a particular node, the link index enables the children of that node to be located.

The path index 345 contains a list of object identifiers for every unique path in the transformed XML document. The path index is sorted on paths and provides fast lookup to all unique paths in the document. The path index typically assigns object identifiers to items in the order in which they occur in the document. For example, if the path for a particular author in a bookstore catalog is "/bookstore/book/title/author," the path index might include the bookstore as 1, the first book as 2, the title of the book as 3, the author as 4, and so forth). The value index 346 is physically part of the path index. For a given path, values are stored in a sorted order to enable efficient searches. For example, a path "/bookstore/book/author/first-name", may have the values "Mary" and "Joe" in the order that they occur in the source document. Despite the fact that Mary occurs before Joe in the path, the offset for "Joe" is stored before offset for "Mary". In this manner the value index facilitates efficient searches when, for example, a user is looking for a particular book title by author's first name.

The OID-Offset table 347 maintains a table of object identifiers (OIDs), the corresponding data offset describing the data for the node, and the link offset describing the parent-children relationship for the node. The SybNode contains data for the nodes in the document. The three indices, the OID-Offset table, and SybNode data are collected as part of a SybXMLStream structure.

Figure 5A:
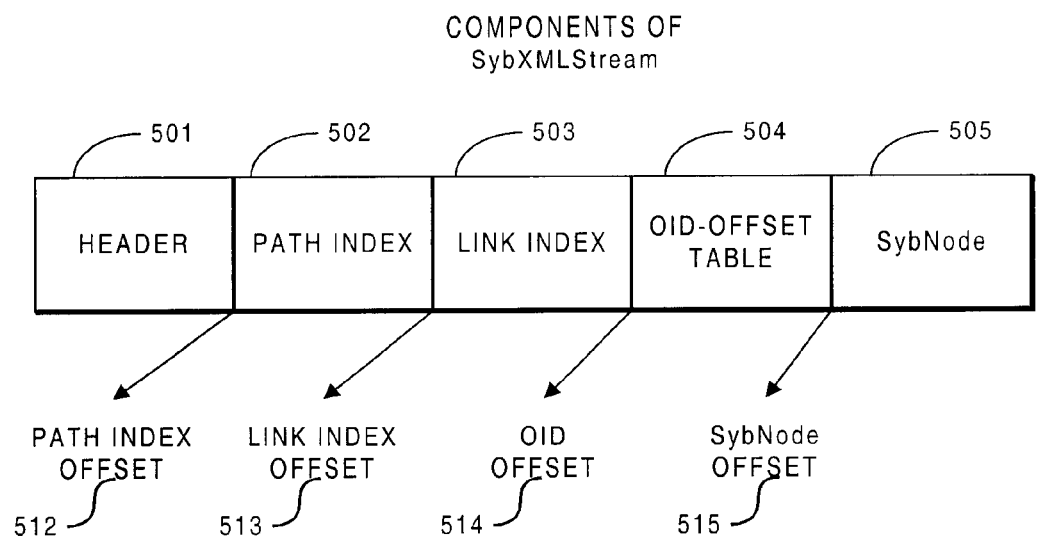
FIG. 5A illustrates the structure of a SybXMLStream object, including three indices, an OID-Offset table, and SybNode data.

FIG. 5A illustrates the currently preferred structure of an exemplary SybXMLStream object generated by transformation of a particular XML document. As shown at FIG. 5A, this exemplary SybXMLStream object includes a header 501, a path index 502 (which includes the value index), a link index 503, an OID-Offset table 504, and SybNode data 505. Also shown at FIG. 5A are offsets to the various indices in the SybXMLStream, including a path index offset 512, a link index offset 513, an OID offset 514, and a SybNode offset 515. The SybXMLStream is, in effect, the meta data created by the above described transformation process. The SybXMLStream object can be stored in a file system, in a database, or in another form of persistent storage. The SybXMLStream object is created once, but can be used multiple times to make access to the XML data available in response to queries that executed at different times.

The above structure enables a query from the XQL Engine to traverse the SybXMLStream and seek access to data at a particular point. In other words, the system has the ability to randomly seek to a position in the stream. A data structure referred to as the execution context is instantiated at the beginning of query execution. The execution context includes the store context and the result context as described in more detail below. The result context stores query results so that these results may be collected and returned. The instantiated store context contains the SybXMLStream object(s) against which the query will be executed. This store context data structure contains the transformed XML data and includes offsets to the various indices in the SybXMLStream, providing methods to fetch node information and to traverse nodes. This is more efficient than a keyword search of entire data records. The SybXMLStream may be stored in a file or a database and queried multiple times. The underlying XML document does not have to be recreated in response to each query. Rather, this methodology enables return of only the portions of the source XML document that are necessary. The result of the query is returned in the form of an XML document as described below.

4. Translation and Execution of Queries by XQL Engine

The XQL parser parses a query received by the XQL Engine from an application. The query translation module receives as input the tree generated by the XQL parser and generates a physical operator tree (or plan) as output. As part of this translation process, the query translation module determines the optimal access plan to be used to obtain the data requested by the query as described in more detail below. The physical operator tree that is output from the query translation module represents a series of requests that can be executed against the XML Store Engine by the query execution module. Once this query translation module has translated the query, the query execution module executes the query against the XML Store Engine using the Path Processor interface.

The query execution module is analogous to query execution module in a conventional relational database engine. A sample query for information generated by the XQL Engine for information in the sample XML document (illustrated above in Example 1) is as follows:

java com.sybase.xml.xql.XqlDriver-qstring "/bookstore/book[author/first-name='Joe']/title"-infile /testxml/bookstore.xml The XQL Engine is invoked by a command from the user or application. In the above sample query, the "qstring" option illustrates the query to be executed ("/bookstore/book[author/first-name='Joe']/title"). The infile option indicates the file to be queried (/testxml/bookstore.xml). The data structure for processing the above query is created on the fly, enabling return of the appropriate information in response to the above query. This is done by parsing the query and translating it into a logical tree. The logical tree is then translated into a physical plan.

The query generated by the XQL Engine contains elements similar to a SQL query. The first "/" operator in the above qstring (or query string) is the root operator because it is a one-element operand. The following "/bookstore/book" combination is like the From command in an SQL query. The "[author/first-name='Joe']" is equivalent to Where in an SQL query. The "[ ]" operator is like a SQL Exists clause. Anything on the left side of this filter operation will pass through this filter only if the conditions inside the filter are true. The "=" operator requires that the right hand side evaluate to a single value (in this case, the literal value 'Joe' as the first name of the author). The "/title" at the end of the query string is comparable to the Select portion of an SQL query. The "/" and "title" operators indicate that the query is looking for "title" only in those books that passed through the filter (i.e., those that have an author with a first name of Joe).

The result of the query is returned as a Java language string containing a well-formed XML document (or document fragment) that has been recomposed from the structure and the information stored in the system. The well-formed XML document returned containing the result of the query is surrounded by the element "<xql_result>". The result of the above sample query is illustrated below.

<xql_result>
    <title>Seven Years in Trenton</title>
</xql_result>

D. Transformation and Storage of XML Documents

1. Creation of SybXMLStream by XML Store Engine

Each component of an exemplary SybXMLStream object will now be described in further detail. Recall from FIG. 5A that a SybXMLStream object includes a header, a link index, a path index (which includes the value index), an OID-Offset table, and SybNode data. The header of each SybXMLStream object contains a "magic" (i.e., system-discernible) string identifying that the stream is XML data that has been transformed. Each header also contains a status indicator, path index offset, link index offset, OID-Offset table offset, and the SybNode offset.

Figure 5B:
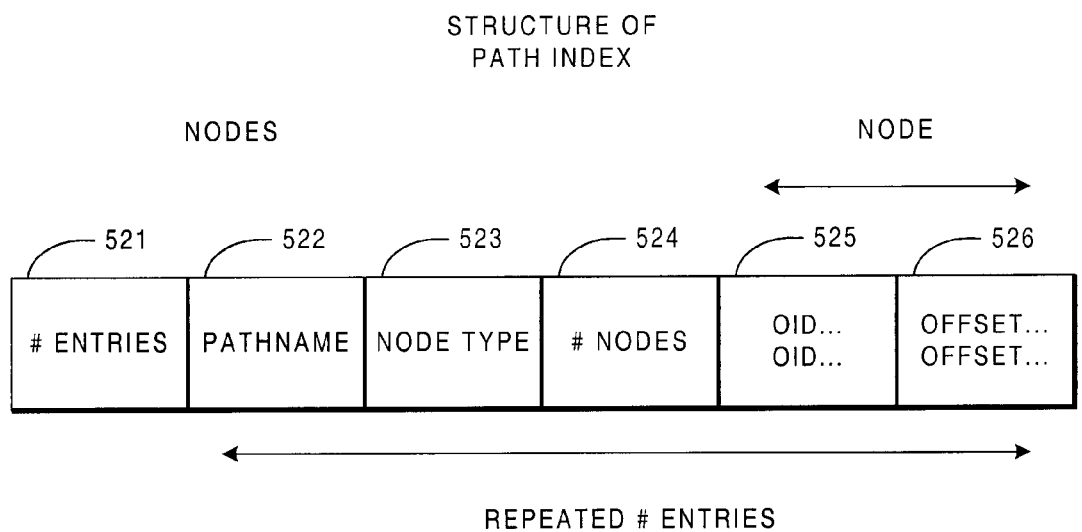
FIG. 5B is an illustration of the structure of a path index.

Next, the path index contains a list of object identifiers ("OIDs" or "object IDs") for every unique path in the transformed XML document. These OIDs are stored in the order of occurrence in the source XML document. The path index is sorted on paths and provides fast lookup to all unique paths in the document. An example of the path index structure is illustrated at FIG. 5B. The path index includes the number of entries 521 and certain information on each entry. This information includes pathname 522, node type 523, number of nodes 524, object IDs (OIDs) 525, and offsets 526, as shown at FIG. 5B. The value index is physically part of the path index.

Offsets are stored in the path index only for the leaf nodes in the sorted order of values. Non-leaf nodes do not have offsets stored. These offsets are the offsets for the data in the SybNode data portion of the SybXMLStream (as described below). The value index helps in pointed queries and range queries where efficient searches can be performed. For example, the path index entry for "/bookstore/book," as shown on FIG. 4B, has OIDs (2, 10). However, as these are non-leaf nodes, this path index entry has no offsets stored. The path index entry for "/bookstore/book/author/firstname/SYBXMLVALUE," as shown on FIG. 4B, has OIDs (7,15) and stored offsets (950, 450). This latter path has stored offsets as it includes leaf nodes for which values are stored. The object IDs are stored in the order they are found in the source document. The offsets are stored in alphabetical or sorted order in the value index based upon the underlying values associated with the offsets.

Figure 5C:
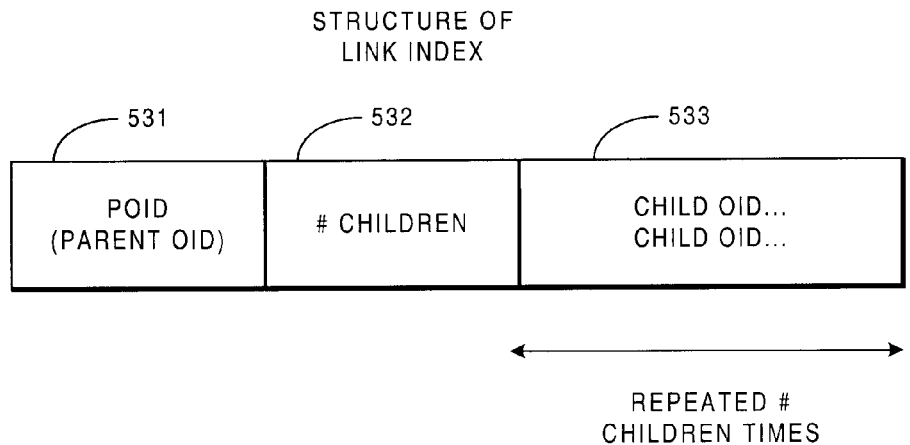
FIG. 5C is an illustration of the structure of a link index.

The link index maintains the parent-child relationship that exists between nodes of the tree. The structure of an exemplary link index is illustrated at FIG. 5C. As shown, the link index lists the node by its parent object ID (or POID) number 531. The link index also lists the number of children (#children) 532 of each node and the object IDs of each of these children (child OID) 533. Using the above example, for instance, a link index entry for object ID 5 is 5, 2, 6, 8. The first number (5) is the object ID of the node. The second number (2) is the number of children of node 5. The third and fourth numbers (6 and 8) are the object IDs of the two children nodes of this node 5. The link index enables the children of a given node to be located. The link index is used at query execution time to form the result XML fragment which is returned in response to a query.

Figure 5D:
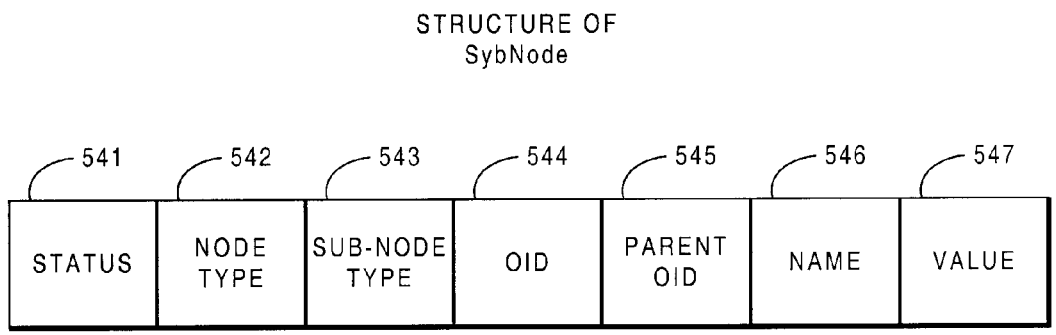
FIG. 5D is an illustration of the structure of a SybNode.

FIG. 5D illustrates the structure of an exemplary SybNode. As shown at FIG. 5D, the following SybNode information is typically stored for every element: status 541, node type 542, sub-node type 543, object ID (OID) 544, parent object ID (POID) 545, node name 546, and node value 547. The node value has valid data only for leaf nodes. The node type can be an element node, an attribute node, comment node, or the like, which describes the node type. In the currently preferred embodiment, the sub-node type is specified only for attribute elements.

Figure 5E:
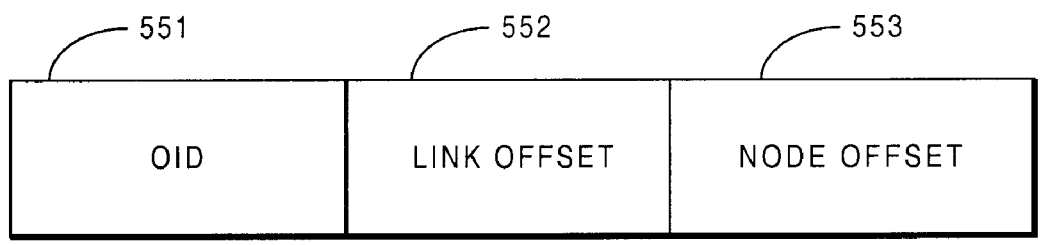
FIG. 5E is an illustration of the structure of an OID-Offset table.

FIG. 5E illustrates the structure of the OID-Offset table. For every node (which is identified by OID 551), two offsets in the stream are stored in the OID-Offset table as illustrated at FIG. 5E. The first offset is the link offset 552 for the link index information for the parent-child relationship. The link offset 552 is from the start of the link index. The second offset is the node offset 553 for SybNode information or, in other words, the data. Node offset 553 is numbered from the start of the SybNode information. The OID-Offset table helps to provide random access on the stream.

During the parsing and transformation process, various indices and SybNode data are built. Whenever a path is encountered, it is inserted into the path index. Parent-child relationships are inserted into the link index. SybNode offsets are inserted for corresponding object IDs and the SybNode object is written into the SybXMLStream. When the end of the XML document is reached (i.e., at the end of parsing and transforming an XML document), all nodes in the tree have been visited. At this point the link offset is calculated and filled in for each OID in the OID-Offset table. A byte array is formed from the header, the three indices, the OID-offset table and the SybNode data. An input stream is created from the byte array and is returned. This input stream is a SybXMLStream object, which includes the SybXMLData and a stream on this data providing random access.

2. XQL Engine

Each query received by the XQL Engine is first parsed by the XQL parser to generate a logical tree representing the query. This logical tree will be translated by the query translation module, which is next described in greater detail.

Figure 6:
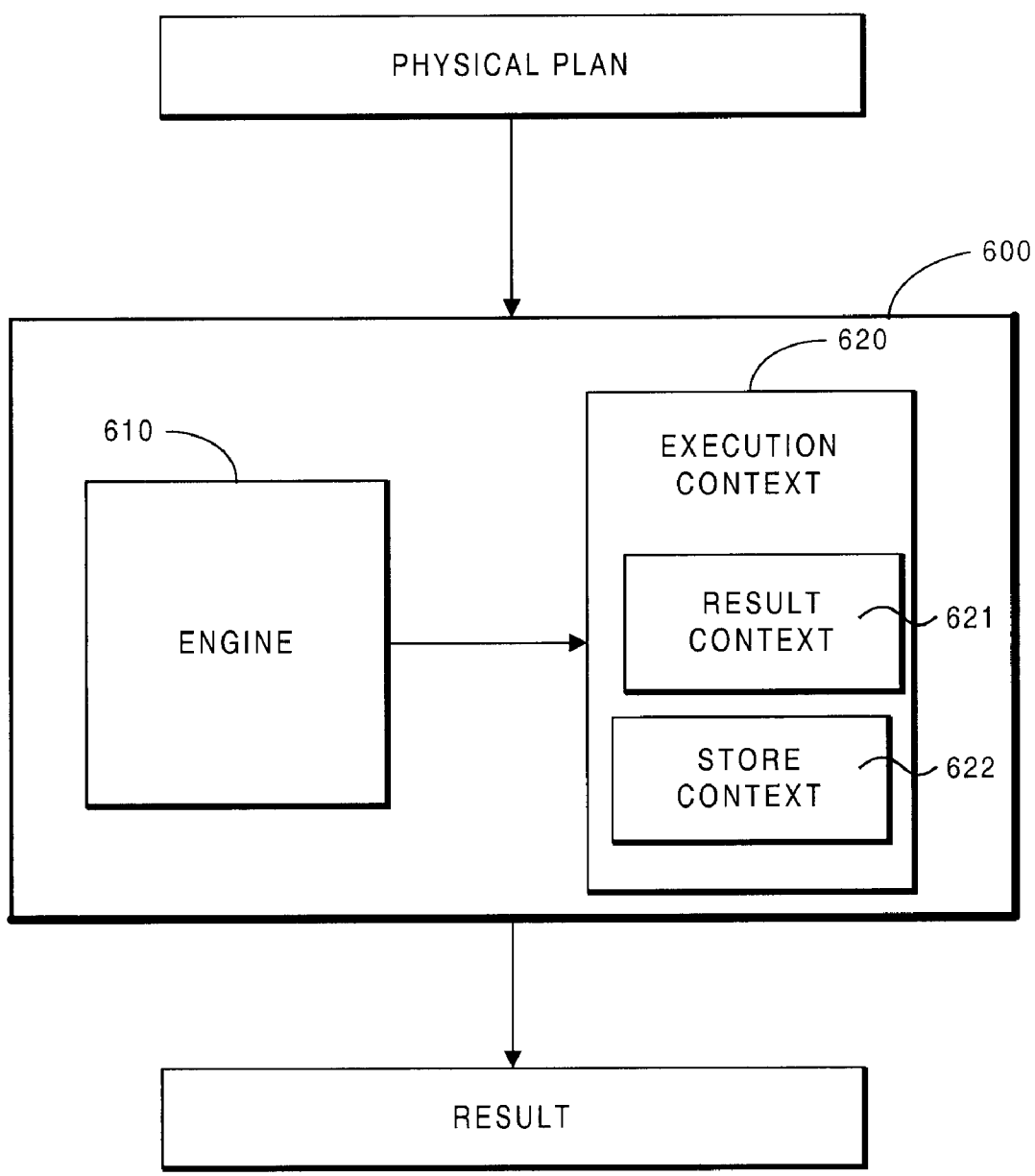
FIG. 6 illustrates the operations of the query execution module of the XQL Engine in executing a query against the XML Store Engine.

The query translation module receives as input the tree generated by the XQL parser and generates a physical operator tree (or plan) as output. The query translation module has a translation strategy for every tree operator. This translation strategy is rule-based and is encapsulated in a method such as "xlate<NAME_OF_TREE_OPERATOR>." The query translation module is invoked with a logical query tree root and recursively calls operator-specific translation methods to translate each fragment of the input tree. The translation module attempts to convert each given tree operator into a single physical operator. If one physical operator is not sufficient, then it generates multiple physical operators, which are connected to each other. Typically, the physical operator is translated for the right and left children of the current operator, and the query translation module connects the plans from translation of the children to the parent to create a physical operator tree. The physical operator tree that is output from the query translation module represents a series of requests that can be executed against the XML Store Engine by the query execution module. The query execution module 600, as illustrated by the high-level block diagram in FIG. 6, runs the translated tree (or plan) generated by the query translation module (not shown). As shown, the query execution module 600 receives a physical plan (the translated physical operator tree) as input and generates a result as output. The engine 610 operates against the execution context 620. The execution context 620 is a data structure that includes both the result context 621 and the store context 622. The result context 621 stores results returned by particular operators so that these can be picked up by another engine operator. The result context 621 is used to store results as an array of search contexts. During translation of a query, slots are reserved for each operator in the plan and the operator is constructed using these reserved slots. At each iteration during execution, results are placed in the pre-assigned slot in the result context array.

The store context 622 contains the SybXMLStream against which the query will be executed. The store context 622 is a data structure that encapsulates the parsed XML data and includes offsets to the various indices in the SybXMLStream. It provides methods to fetch node information and to traverse nodes. The store context 622 is instantiated at the beginning of query execution.

The execution model of the query execution module is based on Goetz Graefe's "Volcano" model of plan execution. For further information on the Volcano model of plan execution see e.g., Graefe, G. "Volcano—an Extensible and Parallel Query Evaluation System" in IEEE Transactions on Knowledge and Data Engineering (TKDE), volume 6(1), pp. 120–135, February 1994, the disclosure of which is hereby incorporated by reference.

3. Path Processor

The Path Processor is the layer between the XQL Query Engine and the XML Store Engine. It abstracts the low level details of the XML Store Engine (Store) layer for the query processing (QP) layer. The Path Processor has not only the knowledge of the various meta data structures, but also how to navigate the transformed XML document using these structures. In the currently preferred embodiment, the Path Processor is implemented by defining a set of methods (APIs) made available to the QP layer called the "SearchContext." The QP layer interacts with the Store layer by invoking the methods as defined by the SearchContext. The SearchContext thus provides the seamless link between the QP and Store layers by performing set operations, iteration, and retrieving information from the underlying Store.

In the currently preferred embodiment, an implementation of the SearchContext is provided which is cognizant of the internal structure of SybXMLData. The methods of the SearchContext are implemented making efficient use of the meta data structures.

4. Example of Query Execution by XML Query Support Engine

The execution of a particular query by the XML Query Support Engine of the present invention is illustrated by the following example of a query looking for all books in a bookstore written by an author whose first name is Joe. Execution of this query requires locating all of the author's first names, using a comparison operation to compare these first names to the requested name (first-name='Joe') and returning information on all of the books which satisfy this request.

The query is first parsed and translated by the XQL parser, which generates a logical tree representing the query. The query translation module of the XQL Engine translates this logical tree into a set of operators (or plan). The following Example 2 is an example of the plan generated by the currently preferred implementation of the query translation module for this sample query.

Example 2

$ java -Dcom.sybase.xml.xql.utils.XmlTrace.T307=true
com.sybase.xml.xql.XqlDriver -qstring "/bookstore/book[author/
first-name = 'Joe']/title" -infile /testxml/bookstore.xml
The query is: /bookstore/book[author/first-name = 'Joe']/title
The translated tree is
- - - - - - - - - - - - - - - - - - - - - - - -
INTERSECT OPERATION on /bookstore/book
INTERSECT MODE is RHSECONDARY
PRIMARY in 10
SECONDARY in 0
LH PRIMARY in 5
LH SECONDARY in 6
RH PRIMARY in 8
RH SECONDARY in 9
   ........................
   GROUPING OPERATION
   PRIMARY in 5
   SECONDARY in 6
   LH Result in 1
   RH Result in 4
      - - - - - - - - - - - - - - - - - - - - - - - - - - - - - - - - - -
      SCAN OPERATION on /bookstore/book
      PROJECTION in 1
      SCAN OPERATION on /bookstore/book/author/first-name
      PROJECTION in 4
- - - - - - - - - - - - - - - - - - - - - - - -
GROUPING OPERATION
PRIMARY in 8
SECONDARY in 9
LH Result in 2
RH Result in 7
   - - - - - - - - - - - - - - - - - - - - - - - - - - - - - - - - - -
   SCAN OPERATION on /bookstore/book
   PROJECTION in 2
   - - - - - - - - - - - - - - - - - - - - - - - - - - - - - - - - - -
   SCAN OPERATION on /bookstore/book/title
   PROJECTION in 7
End translated tree Each physical operator receives as input a set of nodes. If the operator has right and/or left children, these will be used as its inputs. If the operator is a leaf node (i.e. it has no children) then it interacts with the Path Processing layer. The result from this interaction is used to create results for the leaf-level operator. The operator picks up the results of its children from a slot in the result context, which is an array of SearchContext. The set of nodes in each slot are accessed through the SearchContext data structure. Every operator is required to have the following methods:

(1) open ( ) to initialize an operator's local variables and to compute some invariants;

(2) next ( ) to enable every operator to generate results in an iterative manner.

Every call to next ( ) will generate a new result set. If the call to next ( ) returns false, it means the operator has no more results.

Each physical operator outputs a set of nodes to a specified location in the result context array. As described above, every plan has a result context array (or data structure), which is used to store results. The location for placement of the output results is assigned by the query translation module of the XQL Engine. During translation of a query, slots are reserved for each operator in the plan and the operator is constructed using these reserved slots. At each iteration during query execution, results are placed in the pre-assigned slot in the result context array.

The above translated query tree includes several different operations that are described in more detail below. The SCAN operator interacts with the StoreContext data structure by requesting all the nodes that agree to a certain path as shown below in Example 3.

Example 3

```
SCAN OPERATION on /bookstore/book
PROJECTION in 2
```

This operation scans the set of nodes (OIDs) for path "/bookstore/book". For every call to next ( ), it picks the next value in the set of nodes and puts it into the assigned slot (#2) in the results context array.

The COMPARISON operation gets the left hand side SearchContext one at a time and compares it with the literal "Joe". The literal "Joe" signifies the right hand side of the comparison. If the comparison is successful, the left hand side SearchContext is put into the allocated result slot (#5) as shown below in Example 4.

Example 4

```
COMPARISION OPERATION with !=
RHS is Joe
LH in 4
PROJECTION in 5

SCAN OPERATION on /bookstore/book/author/first-name
    PROJECTION in 4
```

The SCAN operator scans all the nodes for the path "/bookstore/book/author/first-name" and stores them in the assigned result slot (#4). The right hand side is an invariant "Joe." For every next ( ) call to COMPARISON, a call is made to next ( ) of SCAN and then a comparison is made with "Joe." If the comparison is successful, slot (#4) is copied to slot (#5). If the comparison is not successful, then it calls next ( ) from SCAN.

The GROUPING operator is a specialized operator, which understands the notion of hierarchy. The GROUPING operator encapsulates the ability to group children with their parents as shown below in Example 5.

Example 5

```
GROUPING OPERATION
PRIMARY in 8
SECONDARY in 9
LH Result in 2
RH Result in 7

SCAN OPERATION on /bookstore/book
    PROJECTION in 2

SCAN OPERATION on /bookstore/book/title
    PROJECTION in 7
```

The SCAN operator on left hand side of GROUPING scans all the nodes for the path "/bookstore/book." For every call to its next ( ) method, the SCAN operator on the left hand side places a node into slot (#2). The SCAN operator on the right hand side of GROUPING scans all the nodes for the path "/bookstore/book/title." For every call to its next ( ) method, the SCAN operator on the right hand side places a node into slot (#7).

When the next ( ) method of the GROUPING operator is called, it calls the next for the left hand side and puts the results in internal slots. Then, the grouping operator calls the next ( ) method of the right hand side and puts the result in an internal slot. If the OID of the current result from the right hand side falls between the two OIDs obtained from the left hand side, it means the first OID obtained from the left hand side is a parent of the current OID from the right hand side. This is true for any XML document because the elements of the XML document were numbered in the order of occurrence in the source document. Iteratively, every left hand side which has a child on the right hand side is placed as the primary result of the GROUPING Operator in result slot (#8). Also, children of the left hand side are grouped together and kept in result slot (#9).

The result of a query is returned as a well-formed XML document or document fragment. The execution of the query results in a SearchContext from which a result fragment is created by the XML Store Engine using the link index, OID-Offset table, and the SybNode data. For example, the sample query "/bookstore/book/author" illustrated above will return (5,13). The link index is used to return the sub tree rooted at 5 and 13. The OID-Offset table is used to obtain offsets for each OID. Using these offsets, data is obtained from the SybNode data. Using all of the above information, the XML fragment is created and returned.

5. Transformation of XML Documents by XML Store Engine

Figure 7:
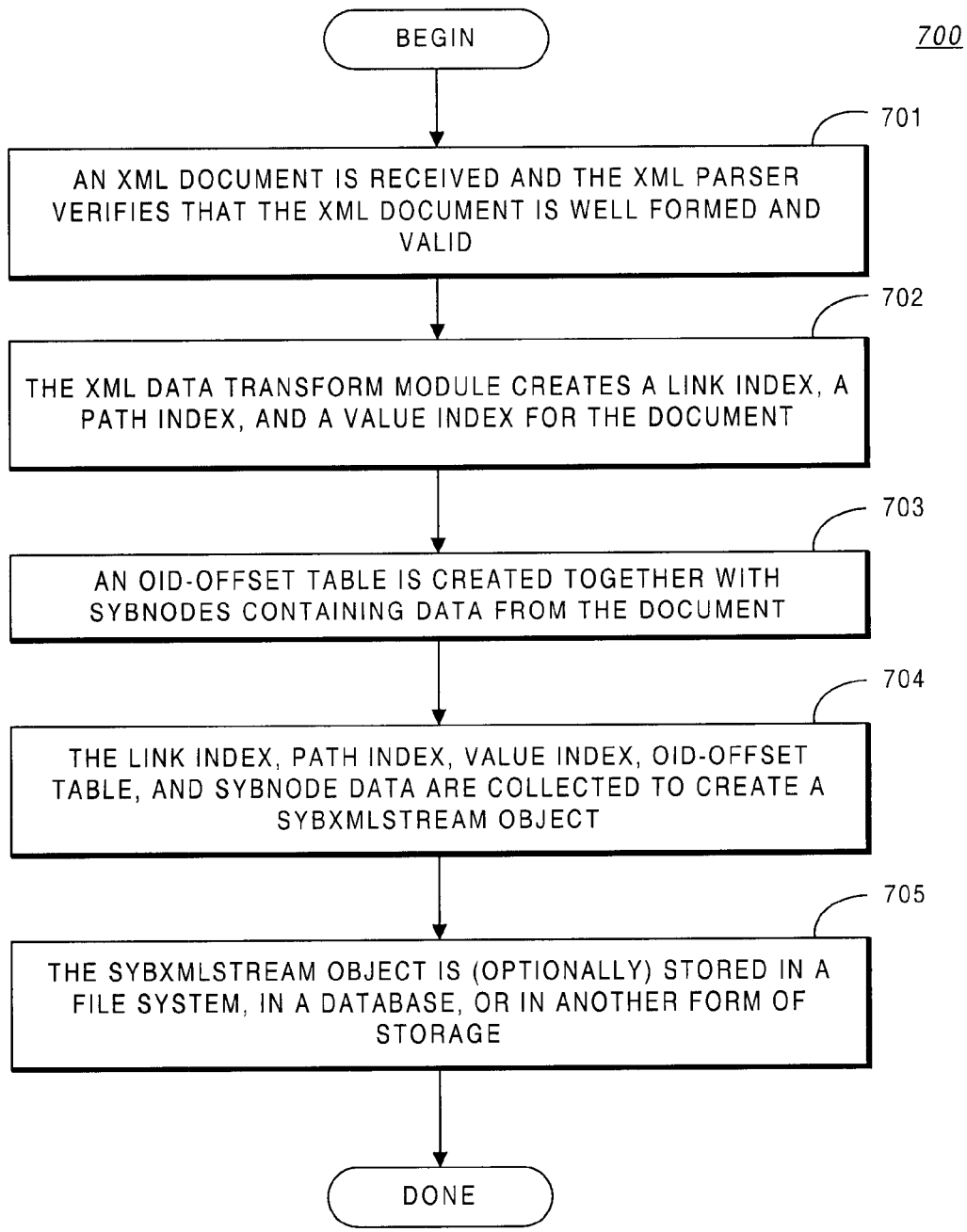
FIG. 7 provides a flowchart illustrating the operations of the XML Store Engine in transforming an XML document into a SybXMLStream object.

FIG. 7 provides a flowchart illustrating the operations of the XML Store Engine in transforming an XML document into a SybXMLStream object, enabling such transformed object to be used to provide random access to information of interest in the source XML document. The transformation process begins when a source document in XML form is received. At step 701, the source document is fed into the XML parser of the XML Store Engine. The XML parser verifies that the source XML document is well formed and valid. An XML document is well formed when every element is the child of only one parent element. An XML document is valid when its elements conform to the document's data type definition.

If the source document is well formed and valid, at step 702 the XML data transform module uses callbacks to create a link index, a path index, and a value index for the document. The transformation process treats each element of the source document as a node or leaf node of a tree as previously described. The link index contains information about the parent-child relationship of nodes, enabling children of a given node to be located. The path index stores hierarchical information (e.g., elements, attributes, processing instructions, comments, or plain text) about particular items of XML data in the order such items are presented in the source document. The value index includes data values in sorted order, enabling more efficient searches of these values.

At step 703, an OID-Offset table is created together with SybNodes containing data from the document. The OID-Offset table maintains a table of object identifiers (OIDs), the corresponding data offset describing the data for the node, and the link offset describing the parent-children relationship for the node. The OID numbers are assigned in the order information is presented in the source document. The link offset is calculated and filled in for each OID in the OID-Offset table.

After the OID-Offset table has been created, at step 704, the three indices (link, path, and value), the OID-Offset table, and SybNode data are collected as part of a SybXML-Stream object. The SybXMLStream object provides an interface or structure enabling random access to the data from the source document. This interface also enables the system to bring only the relevant portion of the transformed document into memory in response to a query seeking to retrieve information within the source document.

At step 705, the SybXMLStream object is (optionally) stored in a file system, in a database, or in another form of persistent storage. The SybXMLStream object may also be retained in system memory. The SybXMLStream object can be used to provide more efficient access to data within the source XML document.

6. Queries of Transformed XML Documents

Figure 8:
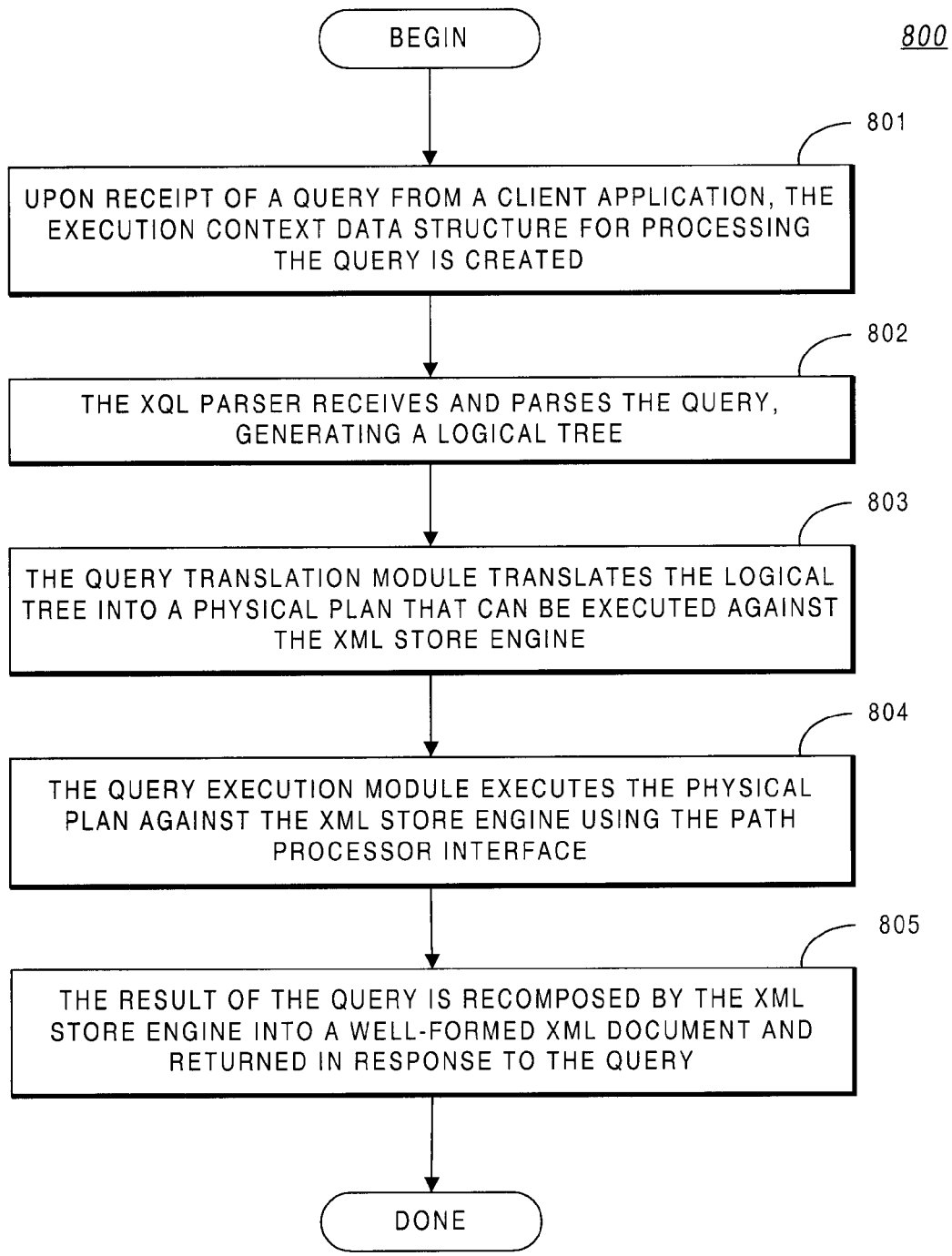
FIG. 8 provides a flowchart illustrating the operations of the XML Query Support Engine in executing a query of a transformed XML document.

FIG. 8 provides a flowchart illustrating the operations of the XML Query Support Engine in executing a query of an XML document that has been transformed by the XML Store Engine. The transformed object created by the XML Store Engine may be stored in a database, file system, system memory or another form of storage. The process begins with the receipt of a query by the XQL Engine. Upon receipt of a query, at step 801, a data structure (called the execution context) for processing the query is created. This data structure contains the transformed object, including parsed XML data and offsets to the various indices in the transformed object, providing methods to fetch node information and to traverse nodes.

At step 802, the XQL parser of the XQL Engine receives and parses a query received from an application (client) and generates a logical tree. The query translation module takes the logical tree and, at step 803, translates the logical tree into a physical operator tree (or plan). The physical plan generated by the query translation module represents a series of requests that can be executed against the XML Store Engine by the query execution module.

The query execution module receives the physical plan and, at step 804, executes this physical plan against the XML Store Engine. The query execution module executes the physical plan using the Path Processor interface. The Path Processor interface provides the ability to navigate the transformed object using the data structure instantiated at step 801. Each step or operator within the query execution module places the output results in the result slots of the execution context data structure. At step 805, the result of the query is recomposed by the XML Store Engine into a well-formed XML document (or document fragment). The XML Store Engine uses the link index, OID-Offset table and SybNode data to convert the applicable portion of the transformed object back into XML format. The resulting XML document or document fragment is returned to the client application in response to the query.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for transforming Extensible Markup Language (XML) documents for querying using a database query, the method comprising:
   receiving an XML document;
   transforming said XML document into a transformed object including information from said XML document together with an interface, said interface providing random access to information of interest within said transformed object; and
   in response to a database query for information of interest, retrieving said information of interest from said transformed object.

2. The method of claim 1, wherein said step of transforming said XML object includes visiting each element of said XML object in order of occurrence.

3. The method of claim 1, wherein said step of transforming said XML object includes assigning a unique identifier to each element of said XML object.

4. The method of claim 3, wherein said unique identifier is an integer assigned to each element of said XML object in monotonically increasing order.

5. The method of claim 1, wherein said step of transforming said XML object includes using simple API for XML methodology to transform said XML object.

6. The method of claim 1, wherein said step of transforming said XML object includes creating indices for said XML object.

7. The method of claim 1, wherein said step of transforming said XML object includes creating an index of linkage information, said index containing the parent/child relationship of nodes.

8. The method of claim 7, wherein said index of linkage information enables said XML object to be recomposed from said transformed object.

9. The method of claim 1, wherein said step of transforming said XML object includes creating an index of hierarchical information about said XML object.

10. The method of claim 9, wherein said index of hierarchical information is in sorted order, said sorted order based upon the occurrence of information in said XML object.

11. The method of claim 1, wherein said step of transforming said XML object includes creating an index of data values contained in said XML object.

12. The method of claim 11, wherein said index of data values is in sorted order, said sorted order based upon said data values.

13. The method of claim 1, wherein said step of transforming said XML object includes maintaining a table containing a unique identifier for each element in said XML object and offsets to data values for each element having associated data values.

14. The method of claim 1, wherein said database query includes a Structured Query Language (SQL) query.

15. The method of claim 1, wherein said database query includes an XML Query Language (XQL) query.

16. The method of claim 1, wherein said interface includes meta data created during said step of transformation of said XML object.

17. The method of claim 1, wherein said transformed object is stored in a database.

18. The method of claim 1, wherein said transformed object is stored in a relational database.

19. The method of claim 1, further comprising:
   providing an application programming interface (API) abstracting interaction with said transformed object to facilitate retrieval of information of interest from said transformed object.

20. A system for transforming Extensible Markup Language (XML) documents for storage in a database, the system comprising:
   a parser event processing module for receiving a given XML document as input and verifying that said XML document is well formed;

a transformation module for transforming said given XML document into an object, said object including data from said given XML document and meta data structures to facilitate random access to said data; and a database for storing said object.

21. The system of claim 20, wherein said database includes a file system.

22. The system of claim 20, wherein said database includes a relational database.

23. The system of claim 20, wherein said database includes system memory.

24. The system of claim 20, wherein said transformation module uses simple API for XML methodology to transform said given XML document.

25. The system of claim 20, wherein said transformation module creates indices for said given XML document.

26. The system of claim 20, wherein said transformation module creates an index containing parent/child relationships for each element in said given XML document.

27. The system of claim 20, wherein said transformation module creates an index containing a list of object identifiers for each unique path in said given XML document.

28. The system of claim 20, wherein said transformation module converts said given XML document into a logical tree in which each element of said given XML document is a node.

29. The system of claim 28, wherein each node is uniquely labeled.

30. The system of claim 28, wherein nodes are labeled in order of occurrence in said given XML document.

31. The system of claim 28, wherein each data value associated with an element is a node without any children nodes.

32. The system of claim 20, wherein said meta data structures include linkage information enabling recomposition of said given XML document.

33. The system of claim 20, wherein said meta data structures include hierarchical information regarding said given XML document.

34. The system of claim 20, wherein said meta data structures include data values from said given XML document in sorted order.

35. The system of claim 20, wherein said meta data structures include a table containing object identifiers and data offsets for each element of said given XML document.

36. The system of claim 20, further comprising:

a query module for executing queries against said database containing said object.

37. The system of claim 36, wherein said query module returns results as an XML object.

38. A system for querying documents in Extensible Markup Language (XML) format using a database query, said system comprising:

a query parsing module for receiving and parsing a given database query into a logical tree;

a query translation module for translation of said logical tree into a query plan, said query plan comprising a format appropriate for execution against transformed XML documents; and a query execution module for executing said query plan and returning results.

39. The system of claim 38, further comprising:

a path processing module defining and implementing interaction between said query execution module and a data processing system containing transformed XML documents.

40. The system of claim 39, wherein said path processing module includes meta data structures to facilitate access to data in transformed XML documents.

41. The system of claim 39, wherein said path processing module regenerates an XML object in response to a query.

42. The system of claim 39, wherein said path processing module includes an application programming interface (API) abstracting interaction with said data processing system.

43. The system of claim 42, wherein said path processing module includes an implementation of said API including meta data structures to facilitate access to data in XML objects.

44. The system of claim 39, wherein said path processing module regenerates a portion of an XML object in response to a query.

45. The system of claim 38, wherein said query parsing module comprises an XQL parser.

46. The system of claim 38, wherein said query translation module receives a logical tree as input and generates a physical operator tree as output.

47. The system of claim 38, wherein said query execution module receives a physical operator tree as input and generates a result as output.

48. The system of claim 47, wherein said result is returned as an XML object.

49. The system of claim 38, further comprising:

a data structure containing transformed XML documents.

50. The system of claim 49, wherein said data structure includes meta data providing access to data in said transformed XML documents.

51. The system of claim 49, wherein said data structure includes parsed XML data.

52. The system of claim 38, further comprising:

a data store module for receiving XML documents as input and transforming said XML documents into transformed objects, said transformed objects including data from said XML documents and meta data enabling access to said data from said XML documents.

53. The system of claim 42, wherein said data store module includes an interface providing random access to data from said XML documents.

54. A method for transforming a document in tag delimited format to enable access to data in said object, the method comprising:

verifying that said document in tag delimited format is well formed;

transforming said document into a logical tree in which each element of said object is a node of said logical tree;

labeling each said node of said logical tree with a unique identifier; and generating an interface facilitating random access to data in said logical tree.

55. The method of claim 54, wherein said step of labeling each said node includes assigning an integer to each said node in monotonically increasing order.

56. The method of claim 54, wherein said step of transforming said document includes visiting each element of said object in order of occurrence.

57. The method of claim 54, wherein said step of transforming said document includes using Simple API for XML methodology to transform said document.

58. The method of claim 54, wherein said step of generating an interface includes creating indices for said document.

59. The method of claim 54, wherein said step of generating an interface includes creating an index of linkage information, said index containing the parent/child relationship of nodes.

60. The method of claim 59, wherein said linkage information enables recomposition of said document in tag delimited format.

61. The method of claim 54, wherein said step of generating an interface includes creating an index of hierarchical information about said document.

62. The method of claim 61, wherein said index of hierarchical information is in sorted order, said sorted order based upon the occurrence of information in said document.

63. The method of claim 54, wherein said step of step of generating an interface includes creating an index of data values.

64. The method of claim 63, wherein said index of data values is in sorted order, said sorted order based upon said data values.

65. The method of claim 54, further comprising:

storing said logical tree and interface in a database.

66. A method for transforming documents in Extensible Markup Language (XML) format to enable access to data in said documents, the method comprising:

receiving documents in XML format;

transforming said documents into a transformed object, said transformed object including data from said documents and meta data facilitating access to said data; and in response to a request, providing data from said documents by performing the substeps of:

parsing said request for data into a logical tree;

transforming said logical tree into a physical plan for execution; and executing said physical plan against said transformed object and returning data resulting from execution of said physical plan.

67. The method of claim 66, wherein said step of transforming said documents into a transformed object includes providing an interface to data in said transformed object.

68. The method of claim 66, wherein said meta data includes at least one index to data in said transformed object.

69. The method of claim 66, wherein said step of transforming said logical tree into a physical plan includes determining an optimal access plan for obtaining data from said transformed object.

70. The method of claim 66, wherein said step of parsing said request for data includes using an XQL parser.

71. The method of claim 66, wherein said step of executing said physical plan includes using meta data structures of said transformed object.

72. The method of claim 66, wherein said step of executing said physical plan includes using an application programming interface of said transformed object.

73. The method of claim 66, wherein said step of returning data resulting from execution of said physical plan includes returning a well-formed XML document containing said data.

\* \* \* \* \*